(12) United States Patent
Papachristou et al.

(10) Patent No.: US 8,001,136 B1
(45) Date of Patent: Aug. 16, 2011

(54) LONGEST-COMMON-SUBSEQUENCE DETECTION FOR COMMON SYNONYMS

(75) Inventors: Dimitra Papachristou, Palo Alto, CA (US); Steven D. Baker, San Francisco, CA (US)

(73) Assignee: Google Inc., Mountain View, CA (US)

( * ) Notice: Subject to any disclaimer, the term of this patent is extended or adjusted under 35 U.S.C. 154(b) by 420 days.

(21) Appl. No.: 12/166,700

(22) Filed: Jul. 2, 2008

Related U.S. Application Data

(60) Provisional application No. 60/948,858, filed on Jul. 10, 2007.

(51) Int. Cl.
  *G06F 7/00* (2006.01)
  *G06F 17/30* (2006.01)
(52) U.S. Cl. .................... 707/758; 707/728; 707/708
(58) Field of Classification Search ................ None
  See application file for complete search history.

(56) References Cited

U.S. PATENT DOCUMENTS

| | | |
|---|---|---|
| 5,331,556 A | 7/1994 | Black |
| 5,594,641 A | 1/1997 | Kaplan |
| 5,832,474 A | 11/1998 | Lopresti |
| 6,466,901 B1 | 10/2002 | Loofbourrow |
| 7,155,427 B1 | 12/2006 | Prothia |
| 2003/0061122 A1 | 3/2003 | Berkowitz |
| 2004/0064447 A1* | 4/2004 | Simske et al. ............ 707/5 |
| 2004/0225667 A1* | 11/2004 | Hu et al. ............ 707/100 |
| 2005/0120020 A1* | 6/2005 | Carus et al. ............ 707/6 |
| 2005/0210003 A1* | 9/2005 | Tsay et al. ............ 707/3 |
| 2005/0278292 A1* | 12/2005 | Ohi et al. ............ 707/1 |
| 2006/0218136 A1* | 9/2006 | Surakka et al. ............ 707/5 |
| 2007/0011154 A1* | 1/2007 | Musgrove et al. ............ 707/5 |
| 2007/0162481 A1* | 7/2007 | Millett ............ 707/101 |

OTHER PUBLICATIONS

Toru Kasai; Linear- Time Longest Common Prefix Computation in Suffis Arrays and It's Applications; 2006;vol. 2089/2006; pp. 181-192.*
Office Action prepared for related case (U.S. Appl. No. 11/582,767), mailed from USPTO on Sep. 15, 2008.

* cited by examiner

*Primary Examiner* — Neveen Abel-Jalil
*Assistant Examiner* — Jermaine Mincey
(74) *Attorney, Agent, or Firm* — Fish & Richardson P.C.

(57) ABSTRACT

One embodiment of the present invention provides a system for identifying synonym candidates. During operation, the system receives a first term and a second term. The system then determines a length of the longer one of the first and second terms, and determines a longest common subsequence of the two terms. The system further produces a result to indicate whether the two terms are synonym candidates based on the length of the longer term and a length of the longest common subsequence of the two terms.

15 Claims, 8 Drawing Sheets

| Test 410 | Score 420 | Base 430 | High 440 |
|---|---|---|---|
| `frequently_alterable` 450 | Ratio of pseudo-queries of a particular type that can be derived from both the original phrase and the synonym = (i)/TDQ | 0.01 | 0.015 |
| `frequently_much_in_common` 460 | Fraction of user queries for which an altered query has at least three search results in common with the original query = (iv)/(ii) | 0.6 | 0.85 |
| `frequently_altered` 470 | Fraction of user queries for which the original query is followed by the altered query within a user session = (v)/TDQ | 0.0005 | 0.0015 |
| `high_altering_ratio` 480 | Fraction of user queries for which the original query is followed by the altered query within a user session divided by the fraction of user queries for which the altered query is followed by the original query within a user session = (v)/(vi) | 1.0 | 3.0 |

FIG. 4

|   | j | 0 | 1 | 2 | 3 | 4 | 5 | 6 |
|---|---|---|---|---|---|---|---|---|
| i |   | $y_j$ | Ⓑ | D | Ⓒ | A | Ⓑ | Ⓐ |
| 0 | $x_i$ | 0 | 0 | 0 | 0 | 0 | 0 | 0 |
| 1 | A | 0 | ↑ 0 | ↑ 0 | ↑ 0 | ↖ 1 | ← 1 | ↖ 1 |
| 2 | Ⓑ | 0 | ↖ ① | ← 1 | ← 1 | ↑ 1 | ↖ 2 | ← 2 |
| 3 | Ⓒ | 0 | ↑ 1 | ↑ 1 | ↖ ② | ← 2 | 2 | 2 |
| 4 | Ⓑ | 0 | ↖ 1 | ↑ 1 | ↑ 2 | ↑ 2 | ↖ ③ | ← 3 |
| 5 | D | 0 | ↑ 1 | ↖ 2 | ↑ 2 | ↑ 1 | ↑ 3 | ↑ 3 |
| 6 | Ⓐ | 0 | ↑ 1 | ↑ 2 | ↑ 2 | ↖ 3 | ↑ 3 | ↖ ④ |
| 7 | B | 0 | ↖ 1 | ↑ 2 | ↑ 2 | ↑ 3 | ↖ 4 | ↑ 4 |

FIG. 5

LONGEST-COMMON-SUBSEQUENCE DETECTION FOR COMMON SYNONYMS

RELATED APPLICATION

This application hereby claims priority under 35 U.S.C. §119 to U.S. Provisional Patent Application No. 60/948,858 filed 10 Jul. 2007, entitled "LONGEST-COMMON-SUBSEQUENCE DETECTION FOR COMMON SYNONYMS," by inventors Dimitra Papchristou and Steven D. Baker.

The subject matter of this application is related to the subject matter of a co-pending non-provisional application by the same inventors as the instant application, entitled "Determining Query Term Synonyms within Query Context," having Ser. No. 11/096,726, and filing date 31 Mar. 2005, and to the subject matter of a co-pending non-provisional application by Steven Baker, Maureen Heymans, Evan M. Martin, Dimitra Papachristou, Trystan G. Upstill, and Ke Yang, entitled "Method and Apparatus for Generating Lexical Synonyms for Query Terms," having Ser. No. 10/582,767, and filing date 17 Oct. 2006.

BACKGROUND

Embodiments of the present invention generally relate to the field of information retrieval, and more specifically to the task of identifying valid synonyms for query terms to facilitate retrieving documents which relate to the query terms.

The relentless growth of the Internet makes locating relevant information on the World Wide Web (the Web) an increasingly challenging task. While search engines can help users locate and retrieve a document of interest on the Web, users often fail to select effective query terms during the search. The problem of finding desired query results becomes increasing challenging as the amount of information available on the Web continues to grow.

For example, a user may enter the query [Web hosting+fort wayne] when the city of Fort Wayne is usually referred to as Ft. Wayne. A user may also enter [free loops for flash movie] when most relevant pages use the term "music" rather than "loops" and the term "animation" rather than "movie." Thus, documents that satisfy a user's informational needs may use different terms than the specific query terms chosen by the user. This problem is further aggravated as the number of terms in a query increases. For queries longer than three or four terms, there is a strong likelihood that at least one of the terms is not the best term to describe the user's intended search. It is therefore desirable for a search engine to automatically modify and/or expand user queries to include synonyms for query terms, so that retrieved documents can better meet the user's informational needs.

This task has proven to be difficult. A simple approach is to use pre-constructed synonym information, for example, from a thesaurus or a structured lexical database. However, thesaurus-based systems have various problems, such as being costly to construct and being restricted to one language.

Accordingly, what is needed is a method and an apparatus that identifies potential synonyms without the above-described problems.

SUMMARY

One embodiment of the present invention provides a system for identifying synonym candidates. During operation, the system receives a first term and a second term. The system determines a longest common subsequence of the two terms. The system further produces a result to indicate whether the two terms are synonym candidates based on the longest common subsequence of the two terms.

In one variation of this embodiment, the system determines a length of the longer one of the first and second terms.

In a further variation, the system computes a ratio between the length of the longest common subsequence and the length of the longer term, and determines whether the ratio is greater than or equal to a predetermined threshold.

In one variation of this embodiment, the longest common subsequence is the longest string of characters, wherein each character therein appears in both the first and second terms, and wherein the order of these characters is preserved by corresponding characters in the first or second term.

In one variation of this embodiment, the system further computes an edit distance between the first term and the second term.

In one variation of this embodiment, the system further computes a confidence level which indicates the likelihood of the two terms being synonyms.

BRIEF DESCRIPTION OF THE FIGURES

FIG. 4 presents a table illustrating several tests that may be used to evaluate the quality or strength of synonym candidates in accordance with one embodiment of the present invention.

FIG. 5 illustrates a table produced in an exemplary longest-common-subsequence detection process in accordance with one embodiment of the present invention.

TABLE 1 presents the pseudo code of a recursive procedure for computing an LCS of two sequences in accordance with one embodiment of the present invention.

TABLE 2 presents the pseudo code of a procedure for printing an LCS of two sequences in accordance with one embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer readable media now known or later developed.

Crawling, Ranking and Searching Processes

Figure 1:
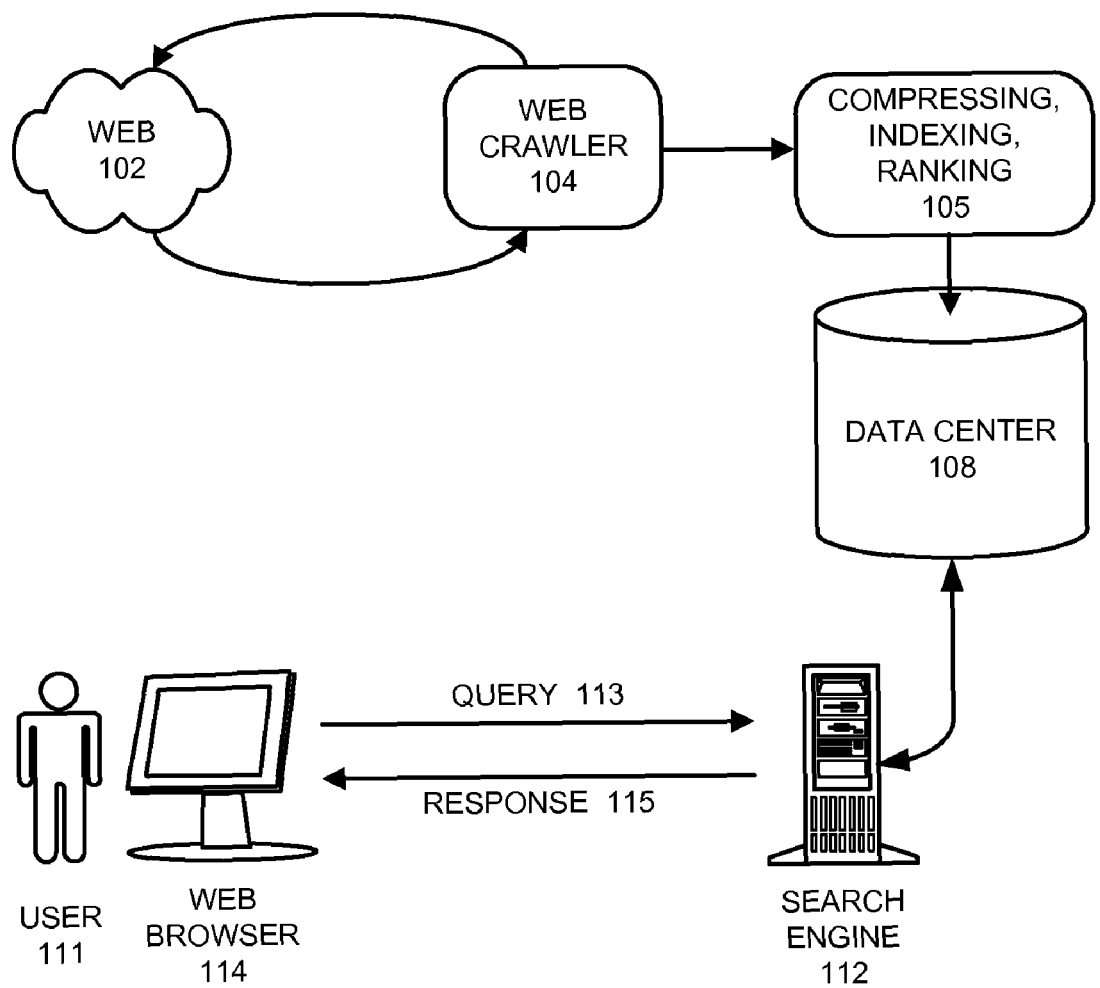
FIG. 1 illustrates the crawling, ranking, and searching processes in accordance with an embodiment of the present invention.

FIG. 1 illustrates the crawling, ranking and searching processes in accordance with an embodiment of the present invention. During the crawling process, a Web crawler 104 crawls or otherwise searches through websites on Web 102 to select Web pages to be stored in indexed form in data center 108. The selected Web pages are then compressed, indexed and ranked in module 105 (using the ranking process described above) before being stored in data center 108.

During a subsequent search process, a search engine 112 receives a query 113 from a user 111 through a Web browser 114. This query 113 specifies a number of terms to be searched for in the set of documents. In response to query 113, search engine 112 uses search terms specified in the query as well as synonyms for search terms to identify highly-ranked documents that satisfy the query. Search engine 112 then returns a response 115 through Web browser 114, wherein the response 115 contains matching pages along with ranking information and references to the identified documents.

Note that some embodiments of the present invention do not require Web crawling. For example, the techniques described herein can also work with other document search and retrieval systems based on manually-controlled system such as human-maintained Web portals, directories, and paid inclusion.

Synonyms

Figure 2A:
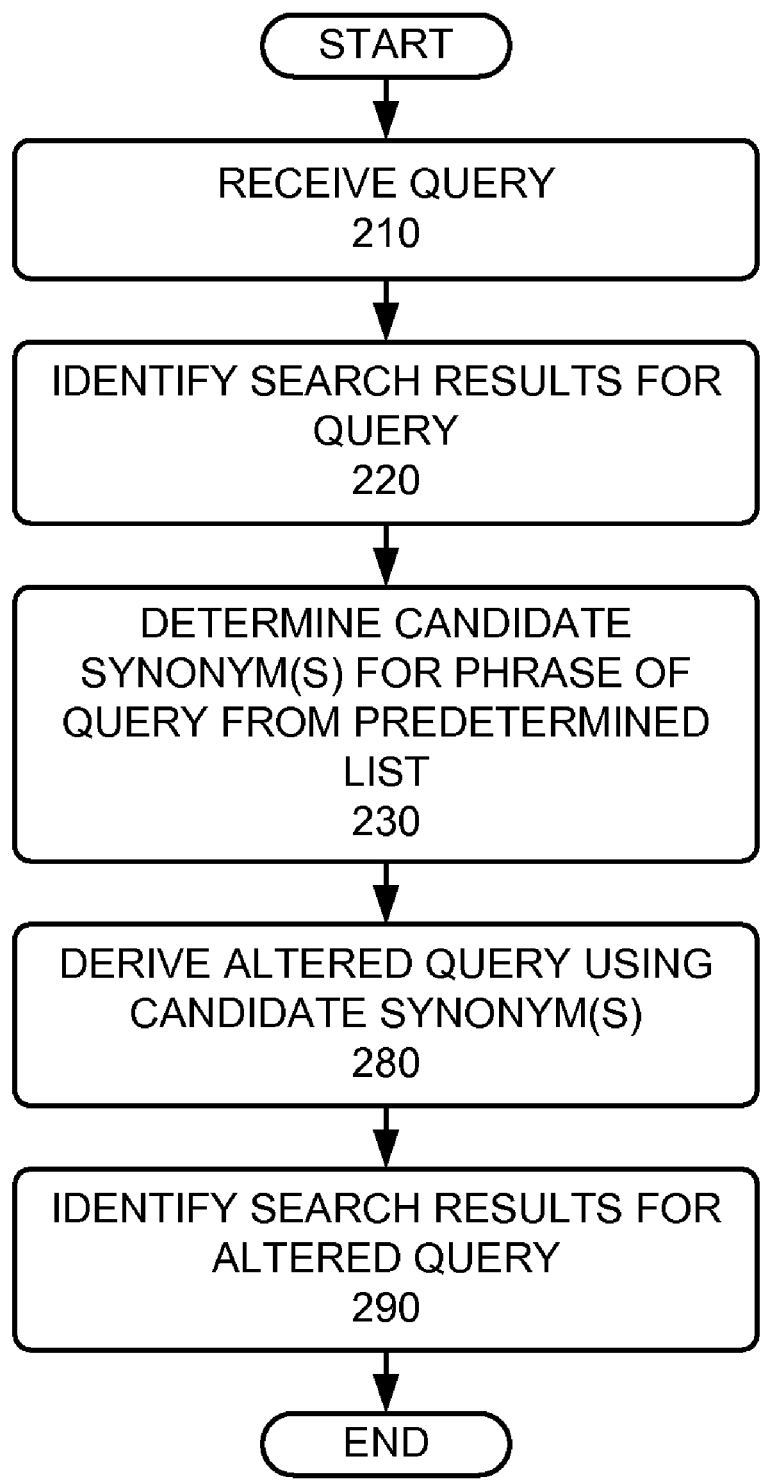
FIG. 2A presents a flowchart illustrating a method for producing altered queries in accordance with one embodiment of the present invention.

FIG. 2A is a flowchart illustrating a method for altering queries to incorporate synonyms in accordance with an embodiment of the present invention. After receiving a search query from a client, a front-end server provides the query to the search engine, which evaluates the query (operation 210). The front-end server and/or search engine can maintain log files or lookup tables for storing each received query and other information. For example, each query can be stored with a user identifier that identifies the browser and/or computer used by the user, a timestamp, and a list of some search results, such as the top ten document IDs that correspond to the search. Other information related to user context or the search itself may also be stored.

Next, a list of search results for the search query is identified (operation 220). The search engine then evaluates the query to retrieve a set of search results for the search query and returns the results to the front-end server. During this process, the search engine communicates with one or more content servers to select documents relevant to the search query. Typically, a content server stores a large number of indexed documents, which are indexed and/or retrieved from different websites. Alternatively, or in addition, the content server can store an index of documents stored on various websites. "Documents" are understood here to be any form of indexable content, including textual documents, images, video, audio, multimedia, presentations, and so forth.

In one embodiment, each indexed document is assigned a page rank according to the document's link structure. This page rank serves as a query-independent measure of the document's importance. An exemplary form of page rank is described in U.S. Pat. No. 6,285,999, which is incorporated by reference herein. The search engine assigns a score to each document based on the document's page rank (and/or other query-independent measure of the document's importance), as well as one or more query-dependent signals of the document's importance (e.g., the location and frequency of search terms in the document).

Figure 2B:
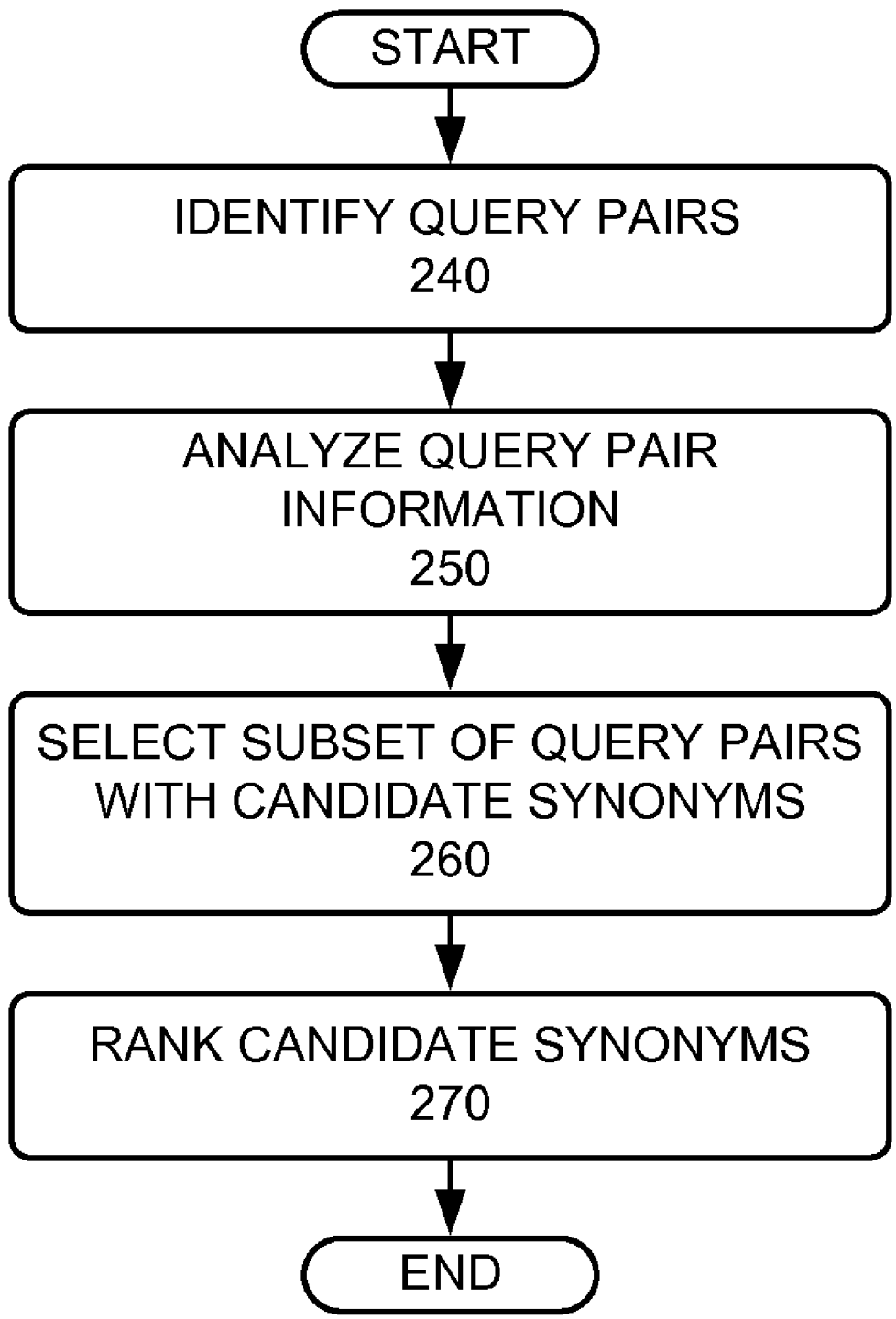
FIG. 2B presents a flowchart illustrating a process for determining one or more synonymous terms in the context of a query in accordance with one embodiment of the present invention.

Then, one or more synonymous terms associated with a context of the search query are identified based on a predetermined list (operation 230). Formation of the predetermined list may be accomplished using various processes. More specifically, FIG. 2B is a flowchart illustrating a process for determining one or more synonymous terms in the context of a search query according to one embodiment of the present invention.

First, query pairs are identified (operation 240). (An example of this process is further described in conjunction with FIG. 3 below.) In one embodiment, this is accomplished by analyzing user query logs and lookup tables. The set of all queries received over some period are reviewed and all original and altered query pairs are identified. An altered query is a query obtained by replacing a phrase in the original query with a candidate synonym. A "phrase," in the context of the present invention, is one or more individual words or terms.

For example, an original query might be [free loops for flash movie], and the altered query might be [free music for flash movie]. In addition, certain queries may be eliminated as having insufficient context. For example, queries used in the analysis may be required to have at least three terms. To facilitate identification of query pairs, possible query fragments, or "pseudo-queries," are formed by removing phrases from the query and replacing each phrase with a token (e.g., ":") that acts as a variable. Then, queries that vary only by the phrase marked with the token are identified as query pairs.

Next, information about the query pairs is analyzed (operation 250). For each query pair, additional information to suggest that the phrase in the original query and altered query are synonymous is identified. For example, the evidence may include the frequency with which both queries in the pair are entered by the same user within a short time interval, or the number of top results that the original query and altered query share.

To further ensure that candidates are effective synonymous, one or more additional tests can be used. One such test is to determine whether for every query containing a phrase A, a corresponding altered query with a phrase B substituted for A has a moderately high probability of occurrence in the stored data. In one embodiment of the present invention, the required probability is 1%.

A second test is that, for every query containing A, the corresponding query with B substituted for A has a minimum probability of being entered by the same user in a short time interval. In one embodiment, the interval is an hour and the probability is 0.1% or greater.

A third test is that, for every query containing A, if the corresponding query with B substituted for A occurs, the two queries have a minimum probability of having a number of the top results in common. In one embodiment, the probability is 60-70% and the number of results in common is 1-3. These tests are described further in conjunction with FIG. 4.

Note that the additional tests can be performed to determine the confidence level of a query candidate. Additionally, the system can perform a combination of these tests and assign a different weight to each test to compute an overall confidence level of the efficacy of a query candidate.

These tests can also be performed for subsets of query pairs in which the phrases appear in a particular context of adjacent words. For example, in the query pair [killer whale free photos] and [killer whale download photos], the candidate synonym pair "free," "download" appears in the context of following "whale," which can be indicated as (whale :), in the context of preceding "photos," which can be indicated as (: photos), in the context of between "whale" and "photos," which can be indicated as (whale : photos) and in the general context, which can be indicated as the token alone (:).

For each phrase, such as "free" above, and for each candidate synonym, such as "download" above, the statistics used for the above tests can be gathered for each of the most common contexts in which the phrase occurs. In this example, the query would be reflected in statistics for all occurrences of "free" in the general context (:); for only occurrences of "free" following "whale" in the context (whale :); for only occurrences of "free" preceding "photos" in the context (: photos); and for only occurrences of "free" between "whale" and "photos" in the context (whale : photos). Because many queries containing the phrase "free" are processed, statistics will be obtained for many contexts in which "free" has occurred, quite possibly many thousands of different contexts.

For each phrase such as "free" above, and for each candidate synonym, such as "download" above, the above tests are performed for the overall context, to determine whether the substitution is generally a good one. For example, it may be determined that "download" is not a good synonym for "free" in the general context, is a good synonym in the context (: photos), and is not a good synonym in the context (: press). The conclusion in this example is that the context (: photos) is an exception to the general rule that "download" is not a good synonym for "free."

From the query pairs, a subset is selected (operation 260) including phrases with candidate synonyms that meet certain criteria. In one embodiment, the criteria are some or all of the tests discussed above in the general context. In another embodiment, a number of top candidate synonyms are selected for the subset of query pairs. A synonym can be considered more significant than other synonyms, for example, if it is used in an altered query more often within user sessions, or if its altered query yields more search results in common with the original query.

Next, candidate synonyms are ranked (operation 270), or qualified, using the criteria discussed above. Initially, the system applies a set of threshold conditions, using the data gathered above as is discussed in greater detail in conjunction with FIG. 4. In one embodiment, the conditions may specify that, for at least 65% of the original-altered query pairs, there is at least one search result in common and that the frequency with which the altered query follows (e.g., occurs within five sequential queries) the original query within a user session is at least 1 in 2000. Then, the statistics from operation 250 are evaluated using a float scale function to determine a score for each qualified synonym, as discussed in greater detail in conjunction with FIG. 3. This score is a measure of the confidence in a qualified synonym. Depending on the application, greater or lesser confidence or strength will be required. Consequently, whether a qualified synonym is declared a useful synonym depends on the threshold value of evidence that is sufficient for the application.

Referring again to FIG. 2A, following identification in operation 230 of synonymous terms, one or more altered queries are derived (operation 280). Various methods exist for deriving alternative queries from the synonymous terms. One such method is disclosed in U.S. patent application Ser. No. 10/629,479, filed on Jul. 28, 2003, entitled "System and Method for Providing a User Interface with Search Query Broadening," which is incorporated herein by reference. In one embodiment, alternative queries are suggested that include the synonym, either as a substitution in or an addition to the query. In another embodiment, when a user enters a given query, a number of alternative queries can be provided back to the user, along with the search results for the original query according to various methods.

In one embodiment, the synonym is treated as equivalent to the original phrase automatically for purposes of document retrieval. For example, the original query can be modified by replacing the phrase with a synonym or a disjunction of the original phrase and a synonym when producing search results for the query.

Based on the results obtained in the above operations, a list of altered search results for the altered query is identified (operation 290). In one embodiment, this list may include a maximum number of results.

Figure 3:
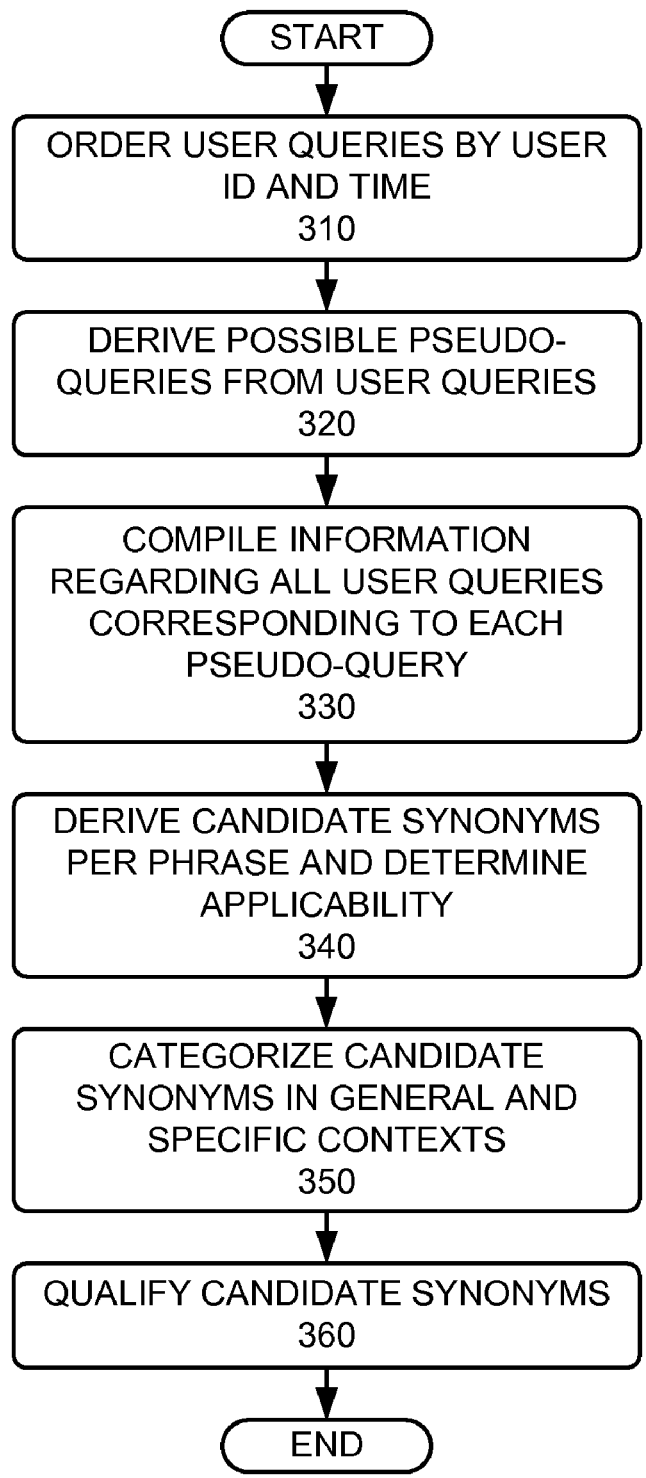
FIG. 3 illustrates an exemplary method for determining candidate synonyms for search query terms in accordance with one embodiment of the present invention.

FIG. 3 depicts an exemplary method for determining candidate synonyms for search query terms according to one embodiment of the invention. In one embodiment, the system sorts all queries received over a period of time, such as a week (operation 310) by user ID (e.g., by cookie), and then by time. This operation organizes the queries into individual user sessions, where a session is defined as queries from an individual client device (or user) occurring with a given time interval, for example one hour (though longer or shorter definitions of a session may be used, as desired). Assume that within a one hour window from one user, the following queries were logged from an individual client device:

[gm cars]
[gm new car prices]
[gm used car prices]
[general motors used car prices]

The system first eliminates certain queries as having insufficient context. In one embodiment, queries used in the analysis have at least three terms. Thus, in the forgoing example, the query [gm cars] is eliminated.

For each remaining query, all possible query fragments, or pseudo-queries, are formed by replacing a sequence of one or more terms with a marker or token (e.g., ":"), while leaving at least two words in the pseudo-queries (operation 320). For the query [gm used car prices], the pseudo-queries are:

[gm : used car prices]
[gm : car prices]
[gm used : prices]
[gm used car :]
[gm : car prices]
[gm : prices]
[gm used :]

The generation of pseudo-queries may be described as iteratively replacing each term (or sequence of consecutive terms) of a query with a universal token. The term (or sequence of terms) that is replaced is called a "phrase."

Records are created for each pseudo-query of each query in session, which will be used to collect contextual information for the pseudo-queries, derive statistical information about term substitution, usage, and search result commonality (operation 330). Each pseudo-query record is keyed by its pseudo-query, the original query from which it was derived, and the phrase that was replaced by the token to produce the pseudo-query. The keying of the pseudo-query records in this manner allows for multiple different sorts and aggregations of the pseudo-query records as further described below. Operation 330 also optionally annotates a pseudo-query record with the first ten resultant document IDs (indicated below as "url#") returned by the search engine in response to the query, either extracted from the log files (if available), or indirectly with a pointer or other reference to an external store of the results. According to one embodiment, fewer or no document IDs may be annotated, to reduce the required storage space.

For the above example user session, one data record produced for [gm used car prices] would be
{pseudo-query: [gm : car prices],
   original_query: [gm used car prices],
   phrase: used,
   related_phrases: <{phrase: new, before: yes, after: no}>
   top_results: <url370293847, url123985709, . . . >
}

Another data record would be
{pseudo-query: [: used car prices],
   original_query: [gm used car prices],
   phrase: gm,
   related_phrases: <{phrase: general motors, before: no, after:yes}>
   top_results: <url370293847, url123985709, . . . >
}

Note that in these examples of pseudo-query records, the field delimiters (e.g., "pseudo-query:") are explicitly shown for illustrative purposes only, and in practice, would not necessarily be present in the actual records themselves. In addition, in these examples, "related phrases" are phrases that may be classified as candidate synonyms.

One of the data records produced for the query [gm new car prices] would have the same pseudo-query as the first record above:
{pseudo-query: [gm : car prices],
   original_query: [gm new car prices],
   phrase: new,
   related_phrases: <{phrase: used, before: no, after: yes}>
   top_results: <url123985709, url093475987, . . . >
}

Similarly, one of the data records produced for the query [general motors used car prices] would have the same pseudo-query as the second record above:
{pseudo-query: [: used car prices],
   original_query: [general motors new car prices],
   phrase: general motors,
   related_phrases: <{phrase: gm, before: yes, after: no}>
   top_results: <url370293847, url123985709, . . . >
}

Generating pseudo-queries operates specifies the range of potential contexts of each phrase implicit within each query. The records corresponding to an individual pseudo-query reflect what is known (i.e., across all user queries in the logs) about one set of queries that differ in only one phrase.

The system then analyzes records for each pseudo-query to generate a new set of records that reflect how well each phrase can function as a synonym for some other phrase, if it occurs in the given pseudo-query (operation 340). Pseudo-query records are sorted by pseudo-query such that all records with the same pseudo-query are grouped together. For example, assume that the records for the pseudo-query [: used car prices] include the two examples from above, plus two more, all of which are shown below:
{pseudo-query: [: used car prices],
   original_query: [gm used car prices],
   phrase: gm,
   related_phrases: <{phrase: general motors, before: no, after: yes}>
   top_results: <url370293847, url123985709, . . . >
}
{pseudo-query: [: used car prices],
   original_query: [general motors new car prices],
   phrase: general motors,
   related_phrases: <{phrase: gm, before: yes, after: no}>
   top_results: <url370293847, url123985709, . . . >
}
{pseudo-query: [: used car prices],
   original_query: [ford used car prices],
   phrase: ford,
   related_phrases: < >
   top_results: <url283923887, url739572390, . . . >
}
{pseudo-query: [: used car prices],
   original_query: [gm used car prices],
   phrase: gm,
   related_phrases: < >
   top_results: <url370293847, url123985709, . . . >
}

Thus, there is another query, [ford used car prices], as well as another instance of the query [gm used car prices] from elsewhere in the logs. Operation 340 generates a single record for each phrase that is identified in a pseudo-query. In other words, all records with the same pseudo-query are grouped together and a new record is created for each phrase covered by the group, reflecting how that phrase relates to the other phrases of the group for that pseudo-query. Continuing the present example, operation 340 creates a record for each of the phrases "gm," "general motors" and "ford." Each record includes candidate synonyms for the respective phrase.

In this example, each record output by operation 340 identifies the ten most significant potential synonyms for each phrase. The significance of synonyms is determined at this stage independent of context according to a hierarchy of tests. First, a synonym that occurs in more related queries within sessions is considered more significant than one that appears in fewer related queries. Second, if two synonyms occur in the same number of related queries within sessions (as is likely to be the case, because relatively few sessions have related queries), a synonym is considered more significant than another if the results returned for a search query that includes the first synonym have more results in common with the results returned for a query with the phrase. Finally, if two synonyms still evaluate as equally significant, one is considered more significant if it occurs more often within the queries corresponding to the respective pseudo-query.

As this example shows, even though a query may appear in several data records, as does [gm used car prices], the query is not weighted more heavily because it appears in more records. This aspect of the calculation is based on empirical evidence that it is more meaningful to examine many distinct queries than to simply count multiple occurrences of a given query.

Continuing with the present example, for the phrase "gm," and the pseudo-query [: used car prices], operation 340 would output:
{phrase: gm,
   original_query: [gm used car prices],
   related_phrases: <{phrase: general motors, common_urls: 5, before: no, after: yes},
{phrase: ford, common_urls: 0, before:no, after: no}>
}

As illustrated, operation 340 passes on the session information from operation 330. For example, the data record above reflects the session queries "gm used car prices," "general motors used car prices," and "ford used car prices." In many cases, like "ford" in this example, there the original and altered queries may occur in different sessions, yet not occur together in a single session. Operation 340 also compares the search results (using, e.g., the document IDs) for each original and altered query if they were recorded, and tracks how many were in common. Thus, in the present example, [gm used car prices] and [general motors used car prices] had 5 documents in common among their respective top ten, while the results for [gm used car prices] had no documents in common with those for [ford used car prices]. Then, the records produced by this operation are sorted by phrase, gathering together all records produced by operation 340 for each phrase.

For each phrase, operation 350 computes statistics that reflect how well each candidate synonym functions as a synonym in general (i.e., in the general context, ":"), as well as in specific contexts. In the examples at this level of the analysis, candidate synonyms are selected from the observed "related phrases." Continuing the present example, assume that for the phrase "gm," operation 350 receives the above record, plus two more:

{phrase: gm,
  original_query: [gm used car prices],
  related_phrases: <{phrase: general motors, common_urls: 5, before:no, after: yes},
  {phrase: ford, common_urls: 0, before:no, after: no}>
}
{phrase: gm,
  original_query: [gm new car prices],
  related_phrases: <{phrase: general motors, common_urls: 4
  before:no, after: no},
  {phrase: 2005, common_urls: 0, before:no, after: no},
  {phrase: best, common_urls: 1, before:no, after: no}>
}
{phrase: gm,
  original_query: [nutrition of gm food],
  related_phrases: <{phrase: genetically modfied, common_urls: 6,
  before: no, after: yes},
  {phrase: macdonalds, common_urls: 0, before: no, after: no}>
}

Operation 350 determines how many queries contained a particular phrase and computes statistics for each candidate synonym of the phrase. In one embodiment, this operation includes determining the number of queries for which the corresponding query with the synonym:
  (i) existed (i.e., appeared in the logs);
  (ii) existed and there was result data for both the original and altered queries, so that common results were computed;
  (iii) existed and had at least 3 results in common;
  (iv) existed and had at least 1 result in common;
  (v) appeared earlier within a session; and
  (vi) appeared later within a session.

Note that in the above operation the quantitative thresholds are for illustration purposes only. Other values of these thresholds can also be used.

In this example, for the phrase "gm" and the candidate synonym "general motors," the statistical data is:
  (i) existed (i.e., appeared in the logs): 2;
  (ii) existed and there was result data for both the original and altered queries, so that common results were computed: 2;
  (iii) existed and had at least 3 results in common: 2;
  (iv) existed and had at least 1 result in common: 2;
  (v) appeared earlier within a session: 0; and
  (vi) appeared later within a session: 1.

This data suggest that "general motors" is a good synonym for "gm," although, in practice, statistics may be gathered over at least 1000 queries including the phrase "gm" in order to have sufficient confidence in the statistics.

In addition to evaluating these statistics for each synonym in the general context, operation 350 also gathers statistics for each context in which the phrase occurs frequently. For example, statistics can be gathered for the 10,000 contexts for which the most queries exist. In this example, the contexts would be (:), (: used), (: used car), (: new), (: new car), (of :), (nutrition of :), (: food), and (of : food). Only one of the queries discussed in the above example (original queries [gm used car prices], gm new car prices], and nutrition of gm food]) belongs to each of these specialized contexts, except the general context, (:), which subsumes all three queries. Realistically, however, some contexts will include data from many queries. Operation 350 evaluates the above statistics for each context, retaining, for each context, only the 20 most common candidate synonyms.

Operation 360 further qualifies candidate synonyms using various tests. FIG. 4 is a table illustrating several tests that may be used to quantify the quality or strength or confidence of a candidate synonym according to one embodiment of the present invention. The tests 410 apply to statistics gathered in operation 350.

The process begins by confirming that two preliminary conditions are satisfied. The first preliminary condition is that for at least 65% of the original-altered query pairs, there is at least one search result (e.g., a URL) in common. The 65% parameter is empirically derived, and other thresholds can be used as well, depending on the corpus of documents. The second preliminary condition is that for at least 1 in 2000 of the query pairs, a user in a session enters the original query followed by the altered query within, e.g., five queries. The threshold values used in this particular embodiment are also for illustrative purposes only, and other values can be used as well.

If both preliminary conditions are satisfied, operation 360 evaluates a number of the statistics from operation 350 as a group and accords weight to each statistic. The evaluation can be based on the following function
Scale ( ):
  float Scale(float score, float base, float high) {
  float x=(score-base)/(high-base);
  float y=(x−sqrt(x*x+4.0))/2.0;
  return 1.0+y;
  }
where score 420 (ratio the test determines), base 430 (target value), and high 440 (scaling factor) are taken from the tests 410 of FIG. 4, which are described in greater detail below.

A series of tests 410 shown in FIG. 4 that apply function Scale ( ) to the data evaluated in operation 350. Scale ( ) is defined such that the value returned is 0 when score=base, asymptotically approaches 1 when score 420 is a large positive value, and is equal to (score-base)/(high-base) when score 420 is large negative. The value of base 430 reflects a desired value for the given test. The individual tests are defined as follows.

frequently_alterable 450 provides a measure of whether, for each query with the phrase of interest, the corresponding altered query occurs frequently enough (preferable more than 1%) to suggest that the candidate synonym makes sense in context. The result of this test is computed as the result (i) from operation 350 (queries in log) over the total number of distinct queries including the phrase (TDQ).

frequently_much_in_common 460 evaluates whether the original queries and altered queries typically exhibit enough results in common to suggest that the meanings of the phrase and candidate synonym are similar. Preferably, at least 60% of altered queries have at least 3 search results in common with the original user query. The result of this test is computed as result (iv) from operation 350 (had at least one result in common) over result (ii) of operation 350 (result data existed for both original and altered queries).

frequently_altered 470 evaluates whether users occasionally try the substitution. Preferably, for every 2000 user queries, there is a corresponding altered query within the same session. The result of this test is computed as result (v) from operation 350 (appeared earlier within a session) over TDQ.

high_altering_ratio 480 measures whether users do not preferentially substitute in the opposite direction, i.e., substitute the phrase for the candidate synonym, which would suggest that the original phrase is much better than the candidate synonym. Preferably, for every user session in which the altered query is followed by the user query, there is at least one session in which the user query is followed by the altered query within a user session. The result of this test is computed as result (v) from operation 350 (appeared earlier within a session) over result (vi) from operation 350 (appeared later within a session).

The following parameters are then computed based on the above test results:
soft_and=frequently_alterable+2*frequently_much_in_common+0.5*frequently_altered+high_altering_ratio; evidence=1.0−exp(−soft_and/1.5),
where exp ( ) is the natural exponential function, and soft_and reflects the totality of the test metrics. The above formula is only one possible embodiment of the present invention. Other formulae are also possible for computing the confidence level of a synonym candidate.

The value of evidence is a measure of the strength of or confidence in a synonym. An evidence value approaching 1.0 indicates very high confidence, while a value of 0.6 reflects good confidence. Depending on the application, greater or lesser confidence or strength can be required. Consequently, whether a candidate synonym is declared a validated synonym depends on the threshold value of evidence that is sufficient for the application. It has been empirically determined that for many applications, for example, a candidate synonym can be validated, e.g., considered equivalent to a phrase, if the value of evidence is greater than 0.6. Again, other thresholds and variations of the Scale function, and its subordinate functions may also be used.

A set of validated synonyms and the corresponding contexts in which they are effective can be utilized in several ways. A conservative approach is to suggest to the user alternative queries into which the synonym has been substituted. For example, when a user enters a given query, a number of alternative queries can be provided back to the user, along with the search results for the original query. Each of the alternative queries can be linked to its associated search results, so that the user does not have to manually re-enter the alternative query.

A more aggressive approach automatically treats the synonym as equivalent to the original phrase for purposes of document retrieval. This approach replaces a phrase with a disjunction of the latter and the synonyms. For example, "gm" would be replaced by "gm" or "general motors." Alternatively, if the evidence for a synonym is relatively weak, the synonym can be used as suggestive rather than equivalent;

An aspect of the present invention includes a computer-implemented method to determine synonyms to serve as substitutions for phrases within an information search query.

Candidate substitutions may be suggested to the user or automatically included in addition to or in place of the original query. Alternatively, the candidate substitution may be used solely to modify the score associated with the retrieved documents. A formula may be used to assess the strength or quality of candidate synonyms, and the strength or quality may be compared to a threshold that is determined according to the application of interest.

Extensions

The preceding discussion describes a generalized technique for discovering and generating context-sensitive synonyms. This technique is very useful, but it does not take into account an important signal—lexical relationships between words. Consequently, the above-described technique misses many useful stems and other lexically similar words.

The following discussion remedies this problem by considering special classes of highly-trusted synonyms which are lexically related to the original word. The system treats these synonyms differently and is more inclusive of these synonyms in the data. These lexically related words can be categorized in various ways, but all share the trait of exhibiting a lexical connection between the original word and the synonym:

(1) synonyms that share the same stem as the original word, according to a industry-standard lexical stemming technique (e.g. car→cars);

(2) synonyms that differ from the original word according to punctuation or spacing differences (e.g. "wood stock"→woodstock, albertsons-→albertson's);

(3) synonyms that are acronyms of the original word/phrase or vice versa. (e.g. VFW→veterans of foreign wars);

(3) synonyms that are similar according to a prefix-biased edit-distance technique;

(4) synonyms that are similar except for accenting on certain characters; and (5) synonyms that are abbreviations of each other (hrs→hours).

The following section discusses exemplary implementations that detect lexical relationships between two words, as well as a scheme to include this signal in synonym generation (as described above) and scoring their confidences that can be applied generally to anything deemed lexically similar.

The following section first describes specific mechanisms for establishing lexical similarity, and then describes a general technique that can use these detection mechanisms.

Detecting Lexical Similarity

Decompounding/Compounding

One technique for detecting synonyms that differ from the original word only by punctuation or spacing is to run through the original word and the synonym, and remove all punctuation and spaces (both defined according to an accepted standard of character sets, e.g. UTF8). The system then compares the results, and if they are equal, the synonym falls into this class. These types of synonyms tend to be prevalent in Germanic languages. An example in English is woodshed->"wood shed." Stripping out the spaces from both, we get "woodshed" and "woodshed" which are identical. An example of a punctuation difference is albertson's→albertsons. After punctuation removal, "albertson's" and "albertsons" become the same.

Acronym Synonyms

If one of the words is a single word, the system can run a edit-distance procedure to align the original word and the phrase. "Edit distance" refers to the number of edits required to change one word to another word. In one embodiment, if a substantial number or fraction of the characters in the single word align with the first letters of the phrase (or vice versa), the system detects this word as an acronym. In addition, the system collects the first characters of all the words in the phrase and runs the edit-distance procedure again against the single word. If they are sufficiently similar within a predetermined number of edits, the system deems the single word as an acronym. In another embodiment, the system checks that all characters in the word align with the first character of each word in the phrase. For example, consider the acronym NASA ->"National Aeronautic and Space Administration." The system extracts from the phrase "NAASA" and attempts to align that with "NASA." There would be one edit (the edition of an "A"). The maximum length of both strings is 5, hence 1/5=0.20 is below 0.25, a predetermined edit-distance threshold. The edit-distance threshold needs not to be fixed, and could be set based on empirical measurements.

Pseudostems

Standard stemming as a conventional synonym-generation technique can often be overly conservative, because in the past it have been used to identify stems without the help of any additional signals. Embodiments of the present invention use standard stemming as just one signal in a system that produces high quality synonyms and stems.

In particular, embodiments of the present invention uses "pseudostemming," a technique that is more inclusive compared with conventional stemmers. During operation, if the original word and the candidate synonym differ by one edit, the system concludes that the candidate synonym is a pseudostem. Otherwise, the system uses a sequence of tests: First the system computes the length of the common prefix the two words share. In one embodiment of the present invention, the system determines whether the number of characters of matching prefix divided by the maximum length of either string is greater than a given threshold. For example, for "shuttler" and "shuttling," the common prefix is "shuttl," of length five. The maximum length is nine, therefore the ratio is 5/9, which is 0.56. An empirically determined threshold can be 0.5, hence this first test passes. Note that in one embodiment one edit is defined as one character change to make two corresponding characters in two terms identical. An "edit distance" is defined as the total number of edits required to make two terms identical.

After the first test, the system examines the leftover strings of both words after the common prefix, which in the above example would be "er" from "shuttler" and the string "ing" from "shuttling." The system calculates the edit distance between the leftover strings, which is an edit distance of three in this example (using a character mismatch cost of one).

In another embodiment, the system can also require this edit distance of the leftover strings be less than a fraction of the maximum length of both strings. For example, the maximum length in the present example is nine, and a given fraction threshold is 0.4, hence the maximum edit distance for the strings to qualify as synonyms is 0.4*9=4.4. An edit distance of three is less than 4.4, hence in this case, the leftover edits would also pass this test. Because the two words in this example pass both tests, the system declares them to be pseudostems.

Diacriticals

In many non-English languages the use of diacritical marks and accents are fairly common. The system can remove these marks with both language-specific and universal de-accenting. If the words are substantially similar after accent removal, they classify as lexical variants. In addition to removing accents in the original words, the system can further input the de-accented words to any of the above techniques. This additional operation allows the system to capture the case where, for example, a character may be accented in the phrase for an acronym, but is not accented in the acronym itself. In one embodiment, comparing an accented to unaccented character does not count as an edit in the pseudostemming or other techniques.

Gender/Number Stemming Detection

In one embodiment, the system can use linguistic rules specific to each language and develop a classifier that detects a word to be a "conservative" stemming variant of another word.

Abbreviations

Many people use abbreviations or short-hands for words. For example, "hours" can be written as "hrs" or "people" as "ppl." In one embodiment, the system can detect abbreviations by removing vowels from both words and measure the edit distance. The system then determines whether the edit distance between the two shortened words is sufficiently small compared with the maximum length of both words. For example, removing the vowels from "hours" produces "hrs." The system computes the edit distance between "hrs" and "hrs," which is 0. The maximum length in this example is three characters, hence the ratio is 0/3, or 0.0. This ratio is less than an acceptable edit-distance threshold, which is empirically determined.

The above listed techniques are not exhaustive. The system can use the above techniques in addition to standard stemming techniques to identify trusted lexical synonyms. In particular, the system can use the Lovins and Porter stemmers. Other stemmers can also be suitable replacements.

Using Lexical Similarity Detection in a Synonym Generation System

The aforementioned technique uses various signals to verify whether a word is indeed a synonym. This technique can be extended to cover lexical synonyms. In one embodiment of the present invention, determining whether a word is a synonym involves considering: (1) a common result requirement, which specifies how frequently common query results should be produced when the word is substituted with the synonym in a query; and (2) a session switching requirement, which specifies how often a user switched the word with the synonym in a given session.

Note that the common result frequency and the session switching frequency provide a rough estimate of how closely the original word and the synonym are semantically related. Because the above detectors for lexical synonyms indicate strongly that the words are semantically related, the system can lower the requirements for common results and for session switching for these classes of synonyms. The system can also determine how far to lower these requirements empirically.

It is observed that acronyms, compounds, and decompounds tend to have different results and sometimes exhibit low session switching. In one embodiment, the system requires no common results for such lexical variants. In a further embodiment, for compounds, decompounds, and punctuation variants, the system can use ⅓ of the requirement for session switching as compared with general synonyms, because compounds and simple punctuation variants generally carry the same meaning and therefore are more likely to be synonyms.

For pseudostems, stems, general/number stems, and abbreviations, the system can trade-off a high session switching rate and a high frequency of occurrence of queries with the substitution anywhere in the logs for a decreased common results requirement. In one embodiment, this includes a high threshold on session switching and the appearance anywhere in the logs (outside of sessions) of the synonym, which then triggers a lower threshold on common results. One could also create a different embodiment that trades the signals with an appropriate mixing function, which is approximated by the threshold in the embodiment above.

The above description specifies schemes that are specific to each lexical type in one embodiment of this invention, but one skilled in the art could recognize alternative schemes, such as categorizing the types into trust levels, symbolized by a number. This number could be used to modulate an aggressivity function for mixing signals that could be equivalent to the above embodiment.

Improved Pseudostem Detection based on Longest Common Subsequence

In some cases, the aforementioned pseudostem-detection technique could miss certain closely related words, especially compound words based on combinations of multiple words. For example, in German, "architekturwettbewerb" means "architecture competition" and "architektenwettbewerb" means "architects' competition." These two terms are closely related, refer to the same event, and hence should qualify as synonyms. However, using the peudostemming technique described above, the system would first detect a common prefix between these two words, which is "architekt." The length of this common prefix is 8 characters. The system then computes the length of the entire word "architekturwettbewerb" or "architektenwettbewerb," which is 21 characters. If the system applies an empirical prefix threshold of 0.5, these two words would not pass the pseudostem test, because 8/21 is 0.38 which is less than 0.5. Hence, the system can dismiss these compound words as synonyms.

One embodiment of the present invention adopts a longest-common-subsequence test to improve the pseudostemming technique, thereby reducing erroneous dismissal of potential synonyms. In one embodiment, instead of measuring the length of a common prefix, the system measures the length of a longest common subsequence to determine whether two terms qualify as synonym candidates and optionally whether additional tests should be applied.

A longest common subsequence (LCS) is defined as follows. Any term can be viewed as a sequence of characters. A subsequence of a given sequence is the given sequence with some characters (possibly none) left out. Formally, given a sequence $X=<x_1, x_2, \ldots, x_m>$, where X represents the term and $x_i$ represents the ith character, another sequence $Z=<z_1, z_2, \ldots, z_k>$ is a subsequence of X, if there exists a strictly increasing sequence of indices of X, $<i_1, i_2, \ldots, i_k>$, such that for all $j=1, 2, \ldots, k$, there is $x_{i_j}=z_j$. For example, $Z=<ctkbwrb>$ is a subsequence of $X=<architekturwettbewerb>$, where the corresponding index sequence is $<3, 6, 8, 12, 20, 21>$. Given two sequences X and Y, a sequence Z is a common subsequence of X and Y if Z is a subsequence of both X and Y. A longest common subsequence, or LCS, of two sequences X and Y, as the name implies, is a common subsequence that has the longest length among all common subsequences.

In the example above, the LCS of the terms "architekturwettbewerb" and "architektenwettbewerb" is "architektwettbewerb." The length of this subsequence is 19 characters. In one embodiment, the system divides this length by the length of the longer one of the two terms, which is 21. The result is 0.90, which easily passes the threshold of 0.5. Therefore, by measuring the length of an LCS, the system can more accurately capture synonym candidates among compound words.

Identifying a Longest Common Subsequence

To identify an LCS of two sequences X and Y, the system can use a brute-force approach by enumerating all subsequences of X and determining whether each subsequence is also a subsequence of Y while recording the longest subsequence found.

In one embodiment, the system can adopt a more efficient approach to the LCS problem. The natural class of sub-problems corresponds to pairs of "prefixes" of the two input sequences. With a given sequence $X=<x_1, x_2, \ldots, x_m>$, the ith prefix of X, for $i=0, 1, \ldots, m$, is defined as $X_i=<x_1, x_2, \ldots, x_i>$. For example, if $X=<A, B, C, B, K, R, W, G>$, then $X_4=<A, B, C, B>$ and $X_0$ is the empty sequence. With two given sequences $X=<x_1, x_2, \ldots, x_m>$ and $Y=<y_1, y_2, \ldots, y_n>$, the following theorem is true for any LCS $Z=<z_1, z_2, \ldots, z_k>$:

1. If $x_m=y_n$, then $z_k=x_m=y_n$ and $Z_{k-1}$ is an LCS of $X_{m-1}$ and $Y_{n-1}$.
2. If $x_m \neq y_n$, then $z_k \neq x_m$ implies that Z is an LCS of $X_{m-1}$ and Y.
3. If $x_m \neq y_n$, then $z_k \neq y_n$ implies that Z is an LCS of X and $Y_{n-1}$.

Based on the above theorem, the system can adopt a recursive approach to identify an LCS. Each LCS problem can be de-composed into one or two sub-problems. For $X=<x_1, x_2, \ldots, x_m>$ and $Y=<y_1, y_2, \ldots, y_n>$, the system first finds an LCS for $X_{m-1}$ and $Y_{n-1}$. If $x_m=y_n$, appending $x_m=y_n$ to this LCS yields an LCS of X and Y. If $x_m \neq y_n$, the system then solves two sub-problems: finding an LCS of $X_{m-1}$ and Y, and finding an LCS of X and $Y_{n-1}$. Whichever of these two subsequences is longer is an LCS of X and Y.

In other words, to find an LCS of X and Y, the system ideally finds the LCS's of X and $Y_{n-1}$ and of $X_{m-1}$ and Y. Each of these sub-problems has the sub-sub-problem of finding the LCS of $X_{m-1}$ and $Y_{n-1}$. One recursive solution to the LCS problem involves establishing a recurrence. In one embodiment, $c[i,j]$ denotes the length of an LCS of the sequences $X_i$ and $Y_j$. If either $i=0$ or $j=0$, one of the sequences has length 0, so the LCS has length 0. The optimal substructure of the LCS problem gives the recursive formula:

$$c[i, j] = \begin{cases} 0 & \text{if } i = 0 \text{ or } j = 0 \\ c[i-1, j-1] + 1 & \text{if } i, j > 0 \text{ and } x_i = y_j \\ \max(c[i, j-1], c[i-1, j]) & \text{if } i, j > 0 \text{ and } x_i \neq y_j \end{cases}$$

TABLE 1 presents the pseudo code of a recursive procedure, LCS-Length (X, Y), for computing an LCS of two sequences $X=<x_1, x_2, \ldots, x_m>$ and $Y=<y_1, y_2, \ldots, y_n>$. The procedure stores the $c[i,j]$ values in a table $c[0 \ldots m, 0 \ldots n]$, the entries of which are computed in row-major order. That is, the first row of c is filled in from left to right, then the second row, and so on. The system also maintains a table $b[1 \ldots m, 1 \ldots n]$ to simplify construction of an optimal solution. $b[i,j]$ points to the table entry corresponding to the optimal sub-problem solution chosen when computing $c[i,j]$. The procedure returns the b and c tables; and $c[m, n]$ contains the length of an LCS of X and Y.

TABLE 1

| | LCS-Length (X, Y) |
|---|---|
| 10 | m ← length [X] |
| 20 | n ← length [Y] |
| 30 | for i ← 1 to m |
| 40 | do c[i, 0] ← 0 |
| 50 | for j ← 1 to n |
| 60 | do c[0,j] ← 0 |
| 70 | for i ← 1 to m |
| 80 | do for j ← 1 to n |
| 90 | do if $x_i = y_j$ |
| 100 | then c[i, j] ← c[i-1,j-1] + 1 |
| 110 | b[i j] ← "↖" |
| 120 | else if c[i-1,j] ≧ [i,j-1] |

TABLE 1-continued

LCS-Length (X, Y)

| | |
|---|---|
| 130 | then c[i,j] ← c[i-1,j] |
| 140 | b[i j] ← "↑" |
| 150 | else c[i,j] ← c[i,j-1] |
| 160 | b[i j] ← "←" |
| 170 | return c and b |

FIG. 5 illustrates the tables produced by the LCS-Length procedure on the sequences X=<A, B, C, B, D, A, B> and Y=<B, D, C, A, B, A>, in accordance with one embodiment of the present invention. The square in row i and column j contains the value of c[i,j] and the appropriate arrow for the value of b[i,j]. The entry "4" in c[7, 6]—the lower right-hand corner of the table—is the length of an LCS <B, C, B, A> of X and Y. For i,j>0, entry c[i,j] depends on whether $x_i = y_j$ and the values in entries c[i-1,j], c[i,j-1], and c[i-1,j-1], which are computed before c[i,j]. To reconstruct the elements of an LCS, the system follows the b[i,j] arrows from the lower right-hand corner. In this example, the path is shaded. Each "↖" on the path corresponds to an entry (highlighted) for which $x_i = y_j$ is a member of an LCS.

The system can use the b table returned by the LCS-Length procedure to construct an LCS of X and Y. The system begins at b[m, n] and traces through the table following the arrows. Whenever the system encounters a "↖" in entry b[i, j], it implies that $x_i = y_j$ is an element of the LCS. The elements of the LCS are encountered in reverse order by this method. The system can use the following recursive procedure to print out an LCS of X and Y in the proper, forward order. The initial invocation is PRINT-LCS(b, X, length[X], length[Y]), the pseudo code of which is presented in TABLE 2.

TABLE 2

PRINT-LCS (b, X, i, j)

| | |
|---|---|
| 10 | if i = 0 or j = 0 |
| 20 | then return |
| 30 | if b[i,j] = "↖" |
| 40 | then PRINT-LCS (b, X, i-1, j-1) |
| 50 | print $x_i$ |
| 60 | elseif b[i, j] = "↑" |
| 70 | then PRINT-LCS (b, X, i-1, j) |
| 80 | else PRINT-LCS (b, X, i, j-1) |

For the b table in FIG. 5, procedure PRINT-LCS prints "BCBA."

Figure 6:
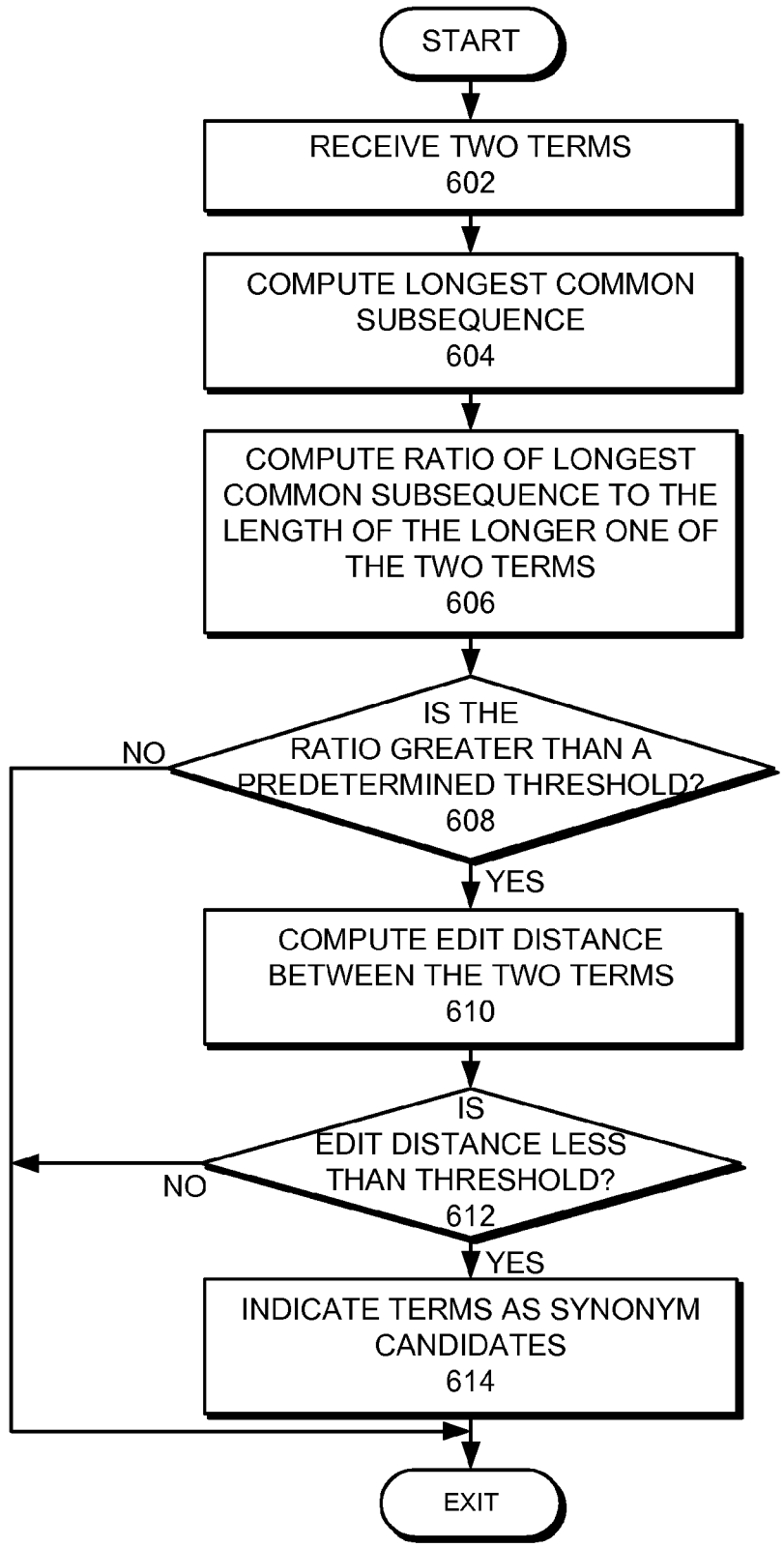
FIG. 6 presents a flow chart illustrating the process of identifying synonym candidates based on longest-common-subsequence analysis in accordance with one embodiment of the present invention.

FIG. 6 presents a flow chart illustrating the process of an LCS test in accordance with one embodiment of the present invention. During operation, the system receives two terms (operation 602). The system then computes an LCS of the two terms (operation 604). The system further computes a ratio of the LCS length to the length of the longer one of the two terms (operation 606).

Subsequently, the system determines whether the ratio is greater than or equal to a predetermined threshold (operation 608). If the ratio is not greater than or equal to the threshold, the system considers the two terms as non-synonyms and exits. Otherwise, the system optionally computes an edit distance between the two terms (operation 610). The system further determines whether the edit distance is less than a threshold (operation 612). If so, the system produces a result to indicate the terms as synonym candidates (operation 614). In one embodiment, the system can apply further tests based on additional signals to determine whether the terms can be considered as synonyms and replace each other in formulating search queries. If the edit distance is greater than or equal to the threshold, the system considers the terms as non-synonyms and exits (operation 614).

Figure 7:
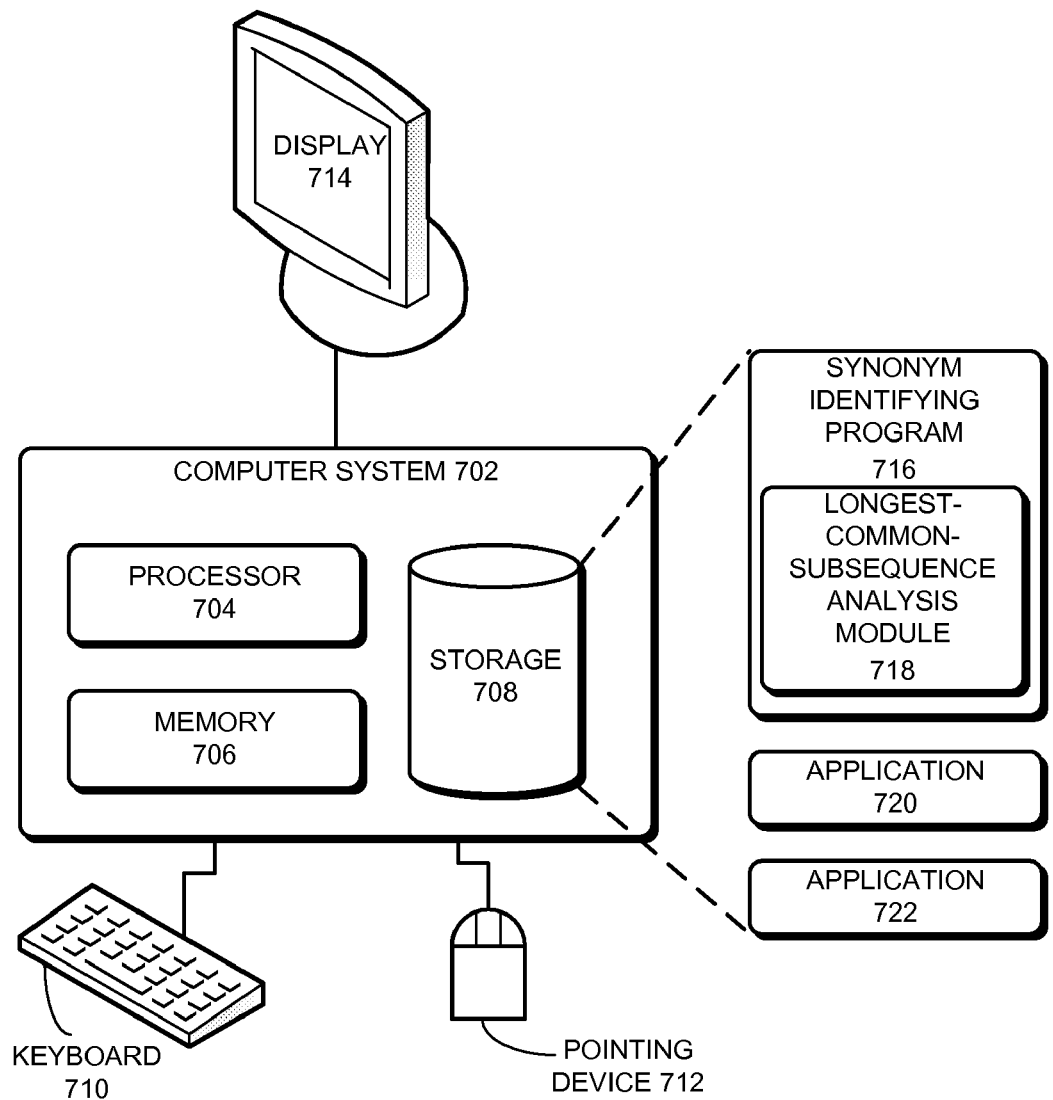
FIG. 7 illustrates an exemplary computer system for identifying synonym candidates based on longest-common-subsequence in accordance with one embodiment of the present invention.

FIG. 7 illustrates an exemplary computer system for identifying synonym candidates based on longest-common-subsequence and/or abbreviation detection in accordance with one embodiment of the present invention. A computer system 702 includes a processor 704, a memory 706, and a storage device 708. Computer system 702 is coupled to a display device 714, a keyboard 710, and a pointing device 712. Storage device 708 stores a synonym identifying program 716, as well as applications 720 and 722.

In one embodiment, synonym identifying program 716 contains a longest-common-subsequence analysis module 718. During operation, computer system 702 loads synonym identifying program 716 into memory 706, and performs the corresponding procedures for longest-common-subsequence analysis in accordance with embodiments of the present invention.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for identifying synonym candidates, the method comprising:

receiving a first term and a second term;

identifying, using one or more processors, a longest subsequence that is common to the first term and the second term;

determining which of the first term and the second term are longer;

determining a ratio between a length of the longest subsequence and a length of the longer of the first term and the second term; and determining that the ratio between the length of the longest subsequence and the length of the longer of the first term and the second term meets a first threshold;

computing an edit distance between the first term and the second term;

comparing the edit distance to a second threshold;

determining that the edit distance meets the second threshold; and designating the first term and the second term as synonym candidates based on determining that the ratio between the length of the longest subsequence and the length of the longer of the first term and the second term meets the first threshold and based on determining that the edit distance meets the second threshold.

2. The method of claim 1, further comprising:

determining a length of the longer of the first and second terms.

3. The method of claim 1, wherein computing an edit distance between the first term and the second term is based on determining that the ratio between the length of the longest subsequence and the length of the longer of the first term and the second term meets the first threshold.

4. A computer system for identifying synonym candidates, the computer system comprising:
one or more processors; and
a computer-readable storage device storing instructions that, when executed by the one or more processors, cause the one or more processors to perform operations comprising:
receiving a first term and a second term;
identifying a longest subsequence that is common to the first term and the second term;
determining which of the first term and the second term are longer;
determining a ratio between a length of the longest subsequence and a length of the longer of the first term and the second term; and
determining that the ratio between the length of the longest subsequence and the length of the longer of the first term and the second term meets a first threshold;
computing an edit distance between the first term and the second term;
comparing the edit distance to a second threshold;
determining that the edit distance meets the second threshold; and
designating the first term and the second term as synonym candidates based on determining that the ratio between the length of the longest subsequence and the length of the longer of the first term and the second term meets the first threshold and based on determining that the edit distance meets the second threshold.

5. The computer system of claim 4, wherein the operations further comprise:
determining a length of the longer of the first and second terms.

6. The computer system of claim 4, wherein computing an edit-distance between the first term and the second term is based on determining that the ratio between the length of the longest subsequence and the length of the longer of the first term and the second term meets the first threshold.

7. A computer readable storage device storing instructions that, when executed by a computer system, cause the computer system to perform operations comprising:
receiving a first term and a second term;
identifying a longest subsequence that is common to the first term and the second term;
determining which of the first term and the second term are longer;
determining a ratio between a length of the longest subsequence and a length of the longer of the first term and the second term; and
determining that the ratio between the length of the longest subsequence and the length of the longer of the first term and the second term meets a first threshold;
computing an edit distance between the first term and the second term;
comparing the edit distance to a second threshold;
determining that the edit distance meets the second threshold; and
designating the first term and the second term as synonym candidates based on determining that the ratio between the length of the longest subsequence and the length of the longer of the first term and the second term meets the first threshold and based on determining that the edit distance meets the second threshold.

8. The computer readable storage device of claim 7, wherein the operations further comprise:
determining a length of the longer of the first and second terms.

9. The computer readable storage device of claim 7, wherein computing an edit distance between the first term and the second term is based on determining that the ratio between the length of the longest subsequence and the length of the longer of the first term and the second term meets the first threshold.

10. The method of claim 1, wherein the first term and the second term are designated as synonym candidates without determining a ratio between the length of the longest subsequence and the length of the shorter of the first term and the second term.

11. The method of claim 1, wherein the first term and the second term have different lengths.

12. The system of claim 4, wherein the first term and the second term are designated as synonym candidates without determining a ratio between the length of the longest subsequence and the length of the shorter of the first term and the second term.

13. The system of claim 4, wherein the first term and the second term have different lengths.

14. The storage device of claim 7, wherein the first term and the second term are designated as synonym candidates without determining a ratio between the length of the longest subsequence and the length of the shorter of the first term and the second term.

15. The storage device of claim 7, wherein the first term and the second term have different lengths.

* * * * *

UNITED STATES PATENT AND TRADEMARK OFFICE
CERTIFICATE OF CORRECTION

| | | |
|---|---|---|
| PATENT NO. | : 8,001,136 B1 | |
| APPLICATION NO. | : 12/166700 | |
| DATED | : August 16, 2011 | |
| INVENTOR(S) | : Dimitra Papachristou and Steven D. Baker | |

It is certified that error appears in the above-identified patent and that said Letters Patent is hereby corrected as shown below:

Title page, Column 2 (Other Publications), Line 2; replace:
"Suffis Arrays and It's Applications; 2006;vol. 2089/2006; pp. 181-" with
-- Suffix Arrays and Its Applications; 2006; vol. 2089/2006; pp. 181- --

Signed and Sealed this
Eighth Day of November, 2011

David J. Kappos
*Director of the United States Patent and Trademark Office*